United States Patent [19]

Patterson

[11] Patent Number: 5,318,675
[45] Date of Patent: Jun. 7, 1994

[54] METHOD FOR ELECTROLYSIS OF WATER TO FORM METAL HYDRIDE

[76] Inventor: James A. Patterson, 2074 20th St., Sarasota, Fla. 34234

[21] Appl. No.: 94,565

[22] Filed: Jul. 20, 1993

[51] Int. Cl.$^5$ .......................... C25B 1/00; C25B 1/04
[52] U.S. Cl. ...................................... 204/86; 204/129
[58] Field of Search .................... 204/86, 263–266, 204/237, 283, 284, 129, 228, 222, 275–278

[56] References Cited

U.S. PATENT DOCUMENTS

| | | | |
|---|---|---|---|
| 2,727,859 | 12/1955 | Freeborn | 204/275 X |
| 2,867,568 | 1/1959 | Cunningham | 204/86 X |
| 3,216,914 | 11/1965 | Whitney | 204/86 X |
| 3,888,756 | 6/1975 | Teshima et al. | 204/275 |
| 3,994,796 | 11/1976 | Mayer | 204/275 X |
| 4,032,425 | 6/1977 | Kametani | 204/263 X |
| 4,316,786 | 2/1982 | Yu et al. | 204/275 X |
| 4,556,469 | 12/1985 | Kim et al. | 204/263 |
| 4,564,432 | 1/1986 | Nagai et al. | 204/263 X |
| 4,913,779 | 4/1990 | Lacoste | 204/222 X |
| 4,943,355 | 7/1990 | Patterson | 204/20 |
| 5,036,031 | 7/1991 | Patterson | 502/10 |

OTHER PUBLICATIONS

"Measurements of Excess Heat from a Pons-Fleischmann-Type Electrolytic Cell Using Palladium Sheet", Fusion Technology, vol. 23, Mar. 1993.
Inorganic Hydrides, B. L. Shaw, Author, Chapter 11 & 12, pp. 101–109.

*Primary Examiner*—Donald R. Valentine
*Attorney, Agent, or Firm*—Charles J. Prescott

[57] ABSTRACT

An electrolytic cell and method of electrolysizing and heating water containing a conductive salt in solution. The electrolytic cell includes a non-conductive housing having an inlet and an outlet and spaced apart first and second conductive foraminous grids connected within the housing. A plurality of non-conductive microspheres each having a uniformly thick outer conductive palladium layer thereon are positioned within the housing in electrical contact with the first grid adjacent the inlet. An electric power source is operably connected across the first and second grids whereby electrical current flows between the grids within the water solution.

15 Claims, 7 Drawing Sheets

METHOD FOR ELECTROLYSIS OF WATER TO FORM METAL HYDRIDE

BACKGROUND OF THE INVENTION

1. Scope of Invention

This invention generally relates to electrolytic cells, and more particularly to an improved electrolytic cell for electrolysis of water and the production of heat.

2. Prior Art

The present invention utilizes microspheres formed on non-metallic beads which are plated with a uniformly thick coating of palladium. These palladium coated microspheres are taught in my previous U.S. Pat. Nos. 4,943,355 and 5,036,031. In these above-recited previous patents, which are incorporated herein by reference, cross linked polymer microspheres having a plating of palladium are taught to exhibit improvements in the absorption of hydrogen.

The use of a palladium sheet to form one electrode within an electrolytic cell to produce excess heat, the electrolytic cell being a Pons-Fleischmann-type is taught by Edmund Storms. The description of the Storms electrolytic cell and his experimental performance results are described in an article entitled *Measurements of Excess Heat from a Pons-Fleischmann-Type Electrolytic Cell Using Palladium Sheet* appearing in Fusion Technology, Volume 3, March 1993. In a previous article, Storms reviewed experimental observations about electrolytic cells for producing heat in an article entitled "Review of Experimental Observations About the Cold Fusion Effect" FUSION TECHNOLOGY, Vol. 20, December 1991.

None of the previously reported experimental results or other prior art devices known to applicant have utilized palladium coated (or other metals which will form "metallic hydrides" in the presence of hydrogen) non-conductive microspheres within an electrolytic cell for the production of heat and the electrolysis of water into its hydrogen and oxygen components. The present invention discloses various embodiments of palladium coated microspheres within an electrolytic cell in conjunction with an electrolytic media containing either water or heavy water, particularly deuterium.

BRIEF SUMMARY OF THE INVENTION

This invention is directed to an electrolytic cell and method of electrolysizing and heating water containing a conductive salt in solution. The electrolytic cell includes a non-conductive housing having an inlet and an outlet and spaced apart first and second conductive foraminous grids connected within the housing. A plurality of non-conductive microspheres each having an outer conductive palladium surface thereon are positioned within the housing in electrical contact with the first grid adjacent the inlet. An electric power source is operably connected across the first and second grids whereby electrical current flows between the grids within the water solution.

It is therefore an object of this invention to utilize palladium coated microspheres as previously disclosed in U.S. Pat. Nos. 4,943,355 and 5,036,031 within an electrolytic cell for the production of either hydrogen and oxygen and/or heat.

It is another object of this invention to provide a variety of cathode constructions utilizing the palladium coated microspheres within an electrolytic cell.

It is yet another object of this invention to provide an electrolytic cell for the increased production of heat in the form of heated water or heavy water-based electrolyte exiting the cell.

It is yet another object of this invention to utilize metal coated non-conductive microspheres in an electrolytic cell, the metal chosen from those which exhibit strong hydrogen absorption properties to form "metallic hydrides".

It is another object of this invention to provide an electrolytic cell for electrolysizing water and/or producing heat which is fault tolerant and having a long mean operating time to failure.

In accordance with these and other objects which will become apparent hereinafter, the instant invention will now be described with reference to the accompanying drawings.

DETAILED DESCRIPTION OF THE INVENTION

Figure 2:
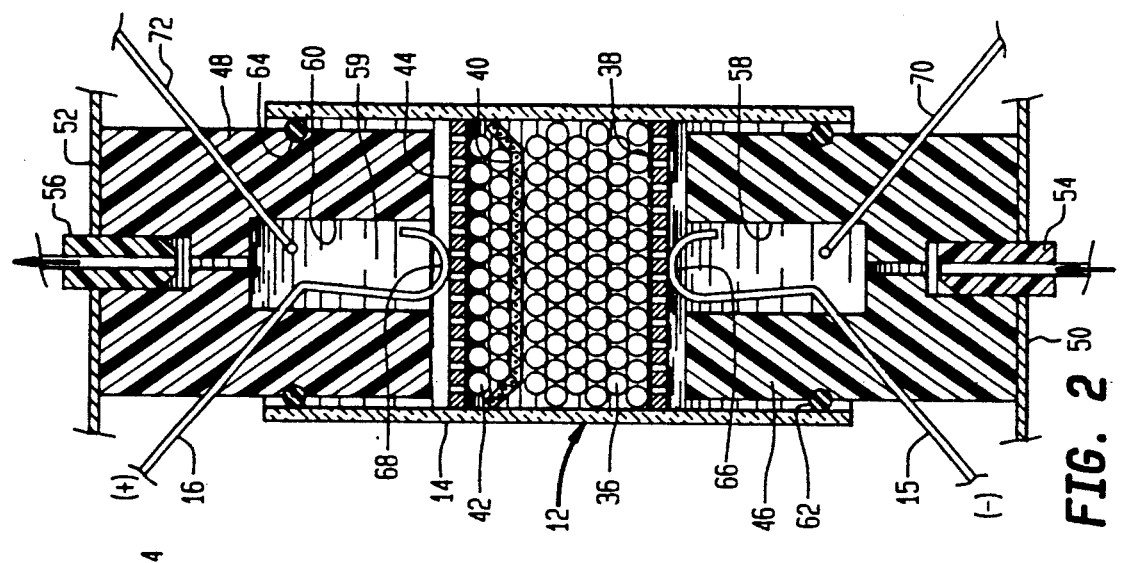
FIG. 2 is a section view of the electrolytic cell shown in FIG. 1.
Figure 1:
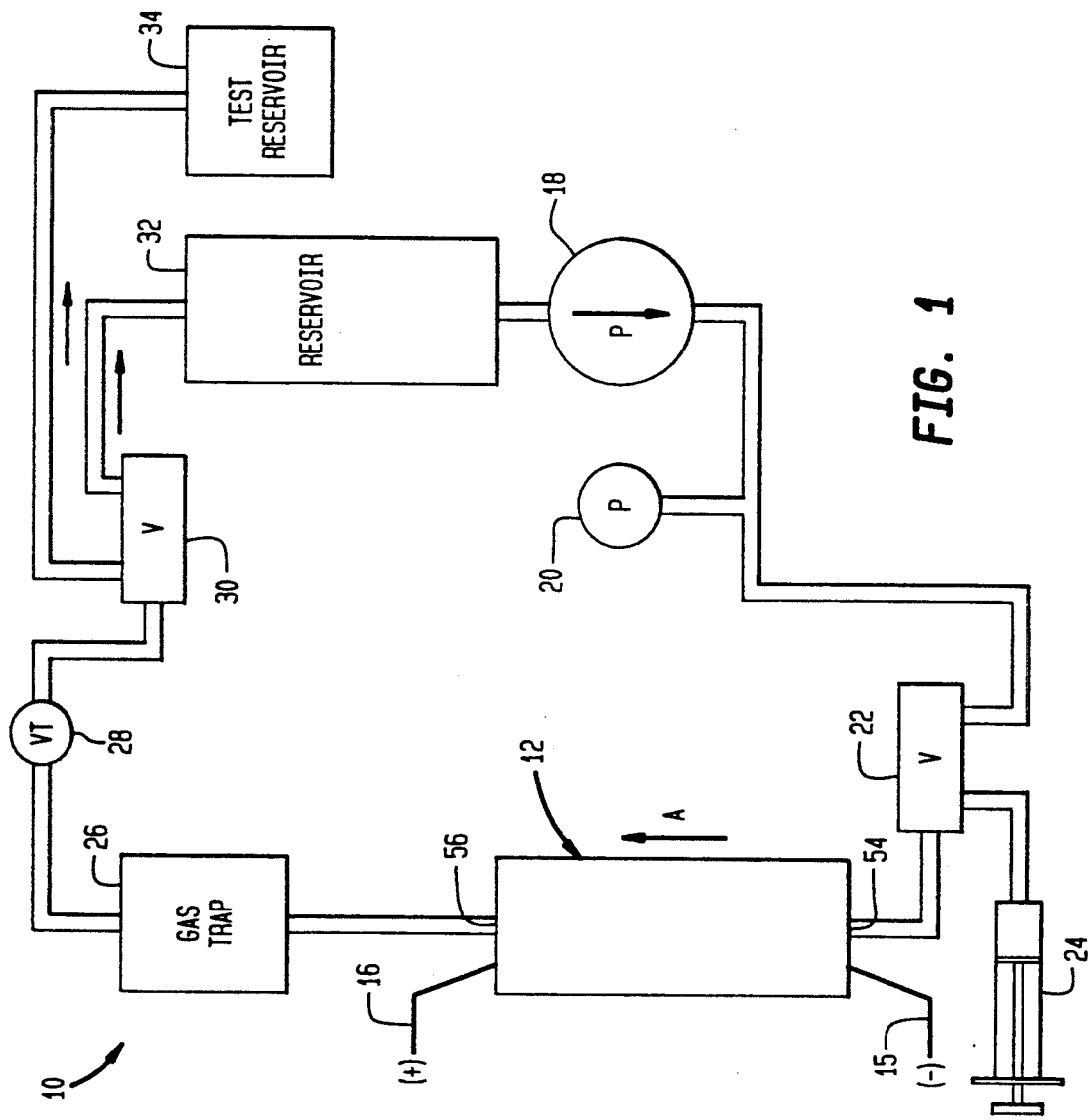
FIG. 1 is a schematic view of an experimental system embodying the present invention.

Referring now to the drawings, and particularly to FIGS. 1 and 2, an experimental system embodying concepts of the invention utilized during testing procedures is shown generally at numeral 10. This testing system 10 includes an electrolytic cell shown generally at numeral 12 interconnected at each end with a closed loop electrolyte circulation system. The circulation system includes a pump 18 which draws a liquid electrolyte 59 from a reservoir 32 and forces the electrolyte 59 in the direction of the arrow into inlet 54 of electrolytic cell 12. This pump 18 is a constant volume pump. After the electrolytic cell 12 is completely filled with the electrolyte 59, the fluid then exits an outlet 56, then flowing into a gas trap 26 which is provided to separate hydrogen and oxygen gas from the electrolyte 59 when required. A throttle valve 28 downstream of the gas trap 26 regulate the electrolyte flow so as to also regulate the fluid pressure within the electrolytic cell 12 as monitored by pressure gauge 20.

A slide valve 22 provides for the intermittent introduction of ingredients into the liquid electrolyte 59 via syringe 24. A second slide valve 30 provides for the periodic removal of electrolyte 59 into test reservoir 34 for analysis to determine correct electrolyte make-up.

In FIG. 2, the details of the electrolytic cell 12 utilized during testing procedures is there shown. A cylindrical glass non-conductive housing 14, open at each end, includes a moveable non-conductive end member 46 and 48 at each end thereof. These end members 46 and 48 are sealed within the housing 14 by O-rings 62 and 64. The relative spacing between these end members 46 and 48 is controlled by the movement of end plates 50 and 52 thereagainst.

Each of the end members 46 and 48 includes an inlet stopper 54 and an outlet stopper 56, respectively. Each of these stoppers 54 and 56 define an inlet and an outlet passage, respectively into and out of the interior volume, respectively, of the electrolytic cell 12. These end members 46 and 48 also include a fluid chamber 58 and 60, respectively within which are mounted electrodes 15 and 16, respectively, which extend from these chambers 58 and 60 to the exterior of the electrolytic cell 12 for interconnection to a d.c. power supply (not shown) having its negative and positive terminals connected as shown. This d.c. power supply is a constant current type.

Also positioned within the chambers 58 and 60 are thermocouples 70 and 72 for monitoring the electrolyte temperature at these points of inlet and outlet of the electrolytic cell 12.

A plurality of conductive microspheres 36 are positioned within housing 14 immediately adjacent and against a conductive foraminous grid 38 formed of platinum and positioned transversely across the housing 14 as shown. These conductive microspheres 36 are formed of non-conductive inner beads having a uniform outer palladium coating. The preferred size of these conductive microspheres are in the range of 1.0 mm or less in diameter and the details of the manufacture of these conductive microspheres 36 are taught in my previous U.S. Pat. Nos. 4,943,355 and 5,036,031, incorporated herein by reference.

In the herein reported testing, an intermediate layer of nickel was added over a copper flash coat. The nickel intermediate layer, producing a mean microsphere density of 1.51 g/cm$^3$, was positioned immediately beneath the palladium plated layer to increase the density of the conductive microspheres 36.

A non-conducive foraminous nylon mesh 40 is positioned against the other end of these conductive microspheres 36 so as to retain them in the position shown. Adjacent the opposite surface of this non-conduct mesh 40 is a plurality of non-conductive microspheres 42 formed of cross-linked polystyrene spherical beads. Against the other surface of this layer of non-conductive microspheres 42 is a conductive foraminous grid 44 positioned transversely across the housing 14 as shown.

The end of the electrode 15 is in electrical contact at 66 with conductive grid 38, while electrode 15 is in electrical contact at 68 with conductive grid 44 as shown. By this arrangement, when there is no electrolyte within the electrolytic cell 12, no current will flow between the electrodes 15 and 16.

ELECTROLYTE

However, when the electrolytic cell 12 is filled with a liquid electrolyte 59, current will flow between the electrodes 15 and 16. The preferred formulation for this electrolyte 59 is generally that of a conductive salt in solution with water. The preferred embodiment of water is that of either light water ($H_2^1O$) or heavy water and more specifically that of deuterium ($H_2^2O$). The purity of all of the electrolyte components is of utmost importance. The water ($H_2^1O$) and the deuterium ($H_2^2O$) must have a minimum resistance of one megohm with a turbidity of less than 0.2 n.t.u. This turbidity is controlled by ultra membrane filtration. The preferred salt is lithium sulfate ($L_2SO_4$) in a 2-molar mixture with water and is of chemically pure quality. In general, although a lithium sulfate is preferred, other conductive salts chosen from the group containing boron, aluminum, gallium, and thallium, as well as lithium, may be utilized. The preferred pH or acidity of the electrolyte is 9.0.

CONDUCTIVE BEADS

Palladium coated microspheres 36 are preferred. However, palladium may be substituted by other transition metals, rare earths and also uranium. In general, any of these metals which are capable of combining with high volumes of hydrogen to form "metallic hydrides" are acceptable. These metals known to applicant which will serve as a substitute are lanthanum, praseodymium, cerium, titanium, zirconium, vanadium, tantalum, uranium, hafnium and thorium. Authority for the inclusion of these elements within this group is found in a book entitled *Inorganic Hydrides*, by B. L. Shaw, published by Pergamon Press, 1967. However, palladium is the best known and most widely studied metallic hydride and was utilized in my previously referenced patents to form conductive hydrogen-absorbing microspheres. In an even more general sense, the broad requirement here is to provide a "metallic hydride" surface, the makeup of the core of the microspheres being a secondary consideration.

ALTERNATE EMBODIMENTS

Figure 3:
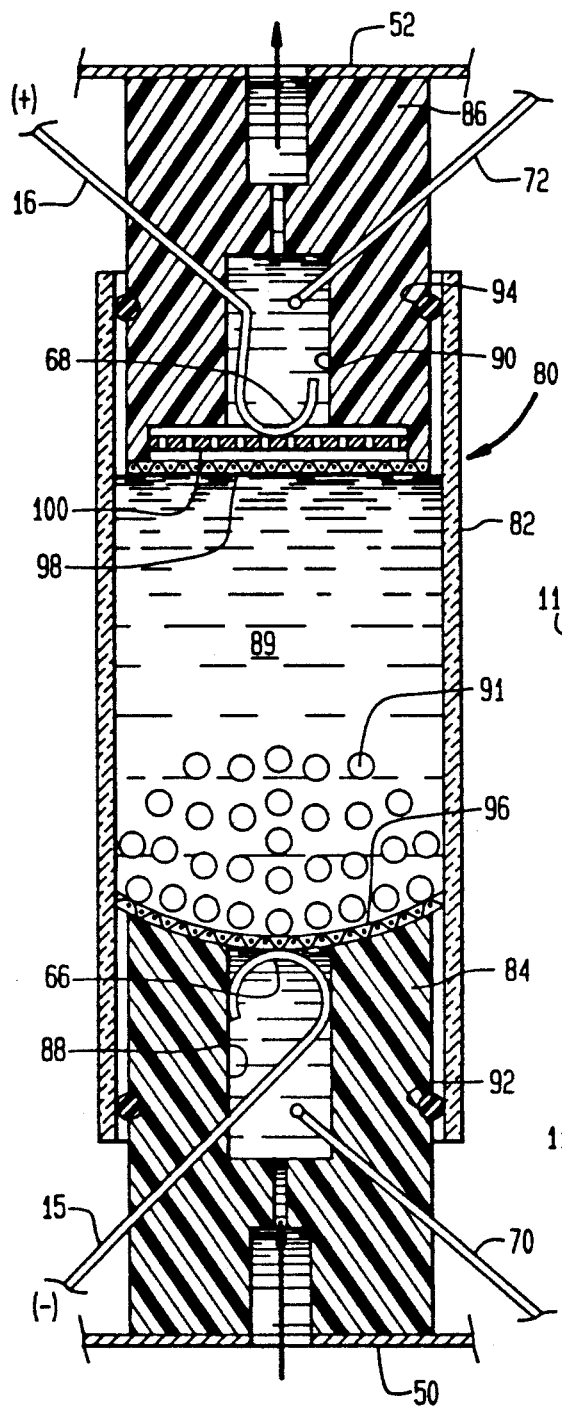
FIG. 3 is a section view of another embodiment of the electrolytic cell during flow of an electrolyte therethrough.
Figure 4:
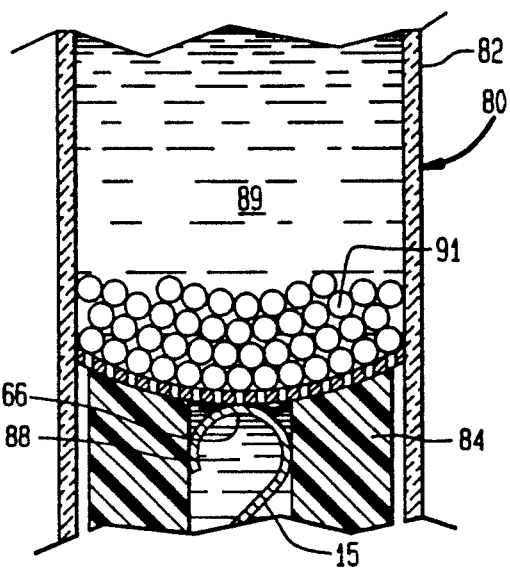
FIG. 4 is a partial section view of FIG. 3 with the electrolytic cell at rest.

Referring now to FIGS. 3 and 4, an alternate embodiment of the electrolytic cell 80 is there shown. In this embodiment 80, a non-conductive glass cylindrical housing 82 is again utilized with non-metallic delrin end members 84 and 86 sealably engaged by O-rings 92 and 94 within the ends of housing 82. Inlet and outlet chambers 88 and 90, respectively are formed into the end members 84 and 86, respectively, end member 84 defining an inlet end, while end member 86 defines an outlet end of the electrolytic cell 80.

A plurality of conductive microspheres 91 formed of a palladium coating over non-metallic beads having a first conductive copper layer and an intermediate nickel layer as previously described are disposed against a concave foraminous conductive grid 96 formed of platinum which is, in turn, disposed against the inner end of end member 84 as shown. An electrode 16 is in electrical contact with the conductive grid 96 within inlet chamber 88 as shown. A thermocouple 70 monitors the temperature of the electrolyte 89 flowing into inlet chamber 88. These conductive microspheres 91 are loosely packed whereby, when the electrolyte 89 flows in the direction of the arrows through the electrolytic cell 80 as shown in FIG. 3, they raise above the upright housing 82 so as to be spaced upwardly toward a non-conductive foraminous nylon mesh 98 positioned adjacent the inner end of end member 86. Thus, by controlling the flow rate of the electrolyte 89, the spread or spacing between the conductive microspheres 91 and the degree of movement or agitation is regulated. Although the loose microspheres 91 roll and mix about, electrical contact is maintained therebetween.

A second conductive foraminous platinum grid 100 is positioned between the non-conductive mesh 98 and end member 86 in electrical contact with another electrode 15 at 68. A thermocouple 72 monitors the temperature of the electrolyte 89 as it flows out of the electrolytic cell 80.

As previously described, the end members 84 and 86 are movable toward one another within housing 82 by pressure exerted against plates 50 and 52. This end member movement serves to regulate the volume of the electrolyte 89 within the electrolytic cell 80.

The conductive beads 91 shown in FIG. 4 are shown in their at-rest position during which very little, if any, electrolyte flow is occurring through the electrolytic cell 82.

Figure 5:
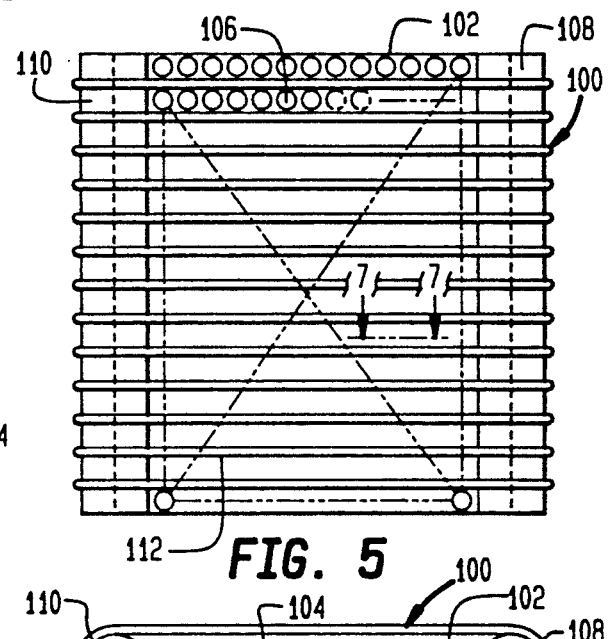
FIG. 5 is yet another embodiment of the combined anode and cathode of an electrolytic cell of the present invention.
Figure 6:
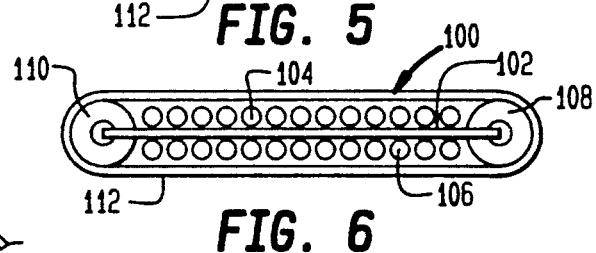
FIG. 6 is an end view of FIG. 5.
Figure 7:
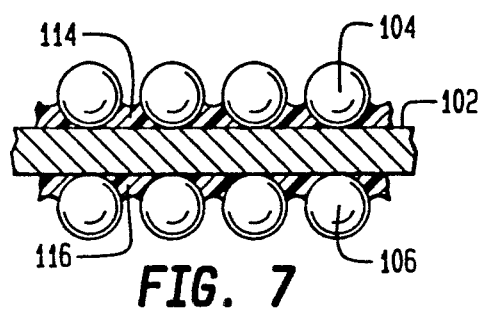
FIG. 7 is an enlarged section view in the direction of arrows 7—7 in FIG. 5.

Referring now to FIGS. 5, 6 and 7, another embodiment of the conductive grids is there shown. A conductive plate 102 formed of silver plated metal having the conductive microspheres 104 epoxy (non-conductive) bonded at 114 and 116 to the conductive plate 102 is utilized to define the cathode of the electrolytic cell. Thus, the only exposed conductive surface in the cathode is that of the conductive microspheres 104. Non-conductive split polyethylene tubes 108 and 110 extend along the opposing edges of conductive plate 102, around which are wound a plurality of conductive wire bands 112 formed of platinum plated silver wire 0.1 cm in diameter. By this arrangement, the electrolyte may flow along the length of the conductive plate 102 and conductive microspheres 104 to form the necessary electrolytic current flow path between the conductive plate 102 (cathode) and the conductive wire bands 112 (anode), all of the conductive bands 112 being in electrical contact with the positive (+) side of the d.c. power supply (not shown), while the conductive plate 102 being in electrical communication with the negative (−) terminal of that power supply.

EXPERIMENTAL RESULTS

Utilizing the experimental arrangement described in FIGS. 1 and 2, the testing procedures incorporated two stages. The first stage may be viewed as a loading stage during which a relatively low level current (0.05 amps) is introduced across the electrodes 15 and 16, that current facilitated between conductive grids 38 and 44 by the presence of the electrolyte 59 as previously described.

During the initial loading, electrolysis of the water within the electrolyte 59 occurs so that the palladium surface of the conductive microspheres 36 fully absorbs and combines with hydrogen, i.e. becomes "loaded". This loading takes about two hours under a current flow through the cell of about 0.05 amps.

After hydrogen and/or hydrogen isotopes, loading of the palladium coating on the conductive microspheres 36, the current level between electrodes 15 and 16 is then incrementally increased, during which time the thermocouples 70 and 72 are monitored to measure inlet and outlet temperature of the electrolyte 59. The temperature of the electrolyte 59 flowing through the electrolytic cell 12 was additionally controlled by increasing the flow rate of the electrolyte 59 therethrough.

A strip recorder was used to monitor and record the inlet and outlet temperatures from thermocouples 70 and 72 over time. Other variables during the testing procedure monitored were the d.c. voltage across the electrodes 15 and 16, the current in amps flowing through the cell between the electrodes 15 and 16, the electrolyte flow rate in millimeters per minute (ml/min) and the fluid pressure (p.s.i.) of the electrolyte 89.

Figure 8:
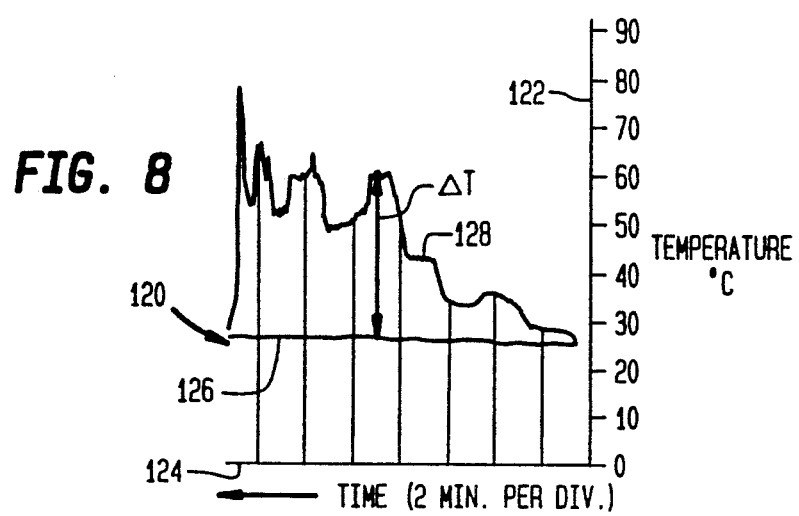
FIG. 8 is a graphic representation of the temperature differential between the electrolyte entering and exiting the electrolytic cell of FIG. 2 utilizing conventional platinum coated microspheres.
Figure 9:
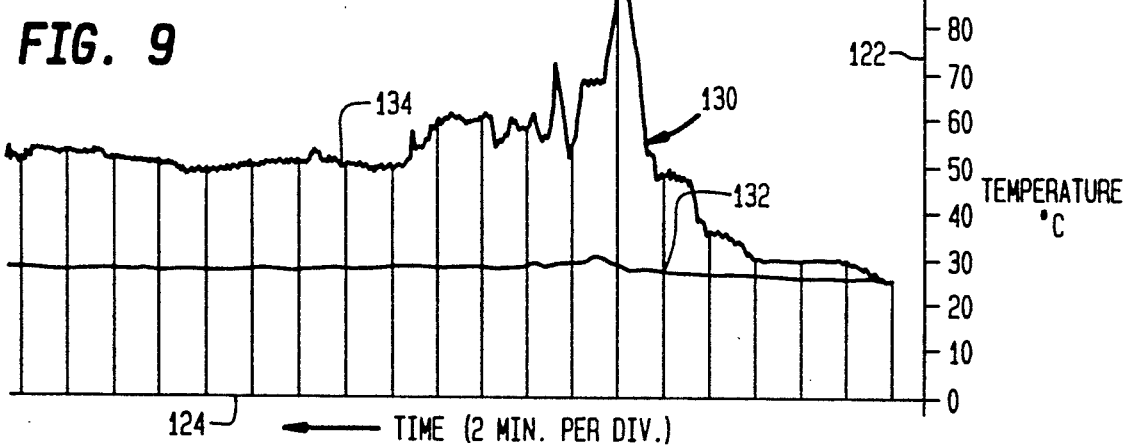
FIG. 9 is a graph similar to FIG. 8 utilizing palladium coated microspheres and an electrolyte containing water within the electrolytic cell of FIG. 2.
Figure 10:
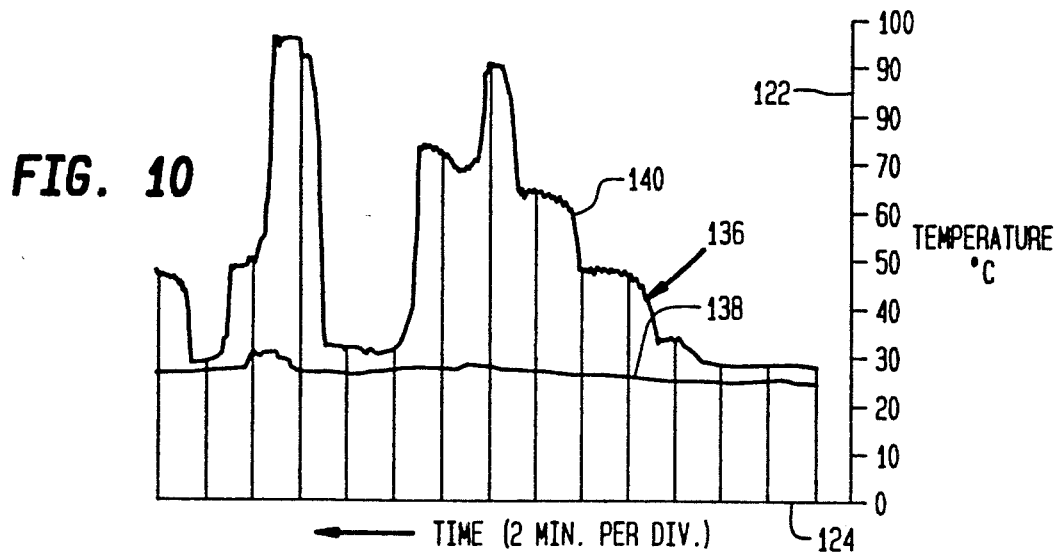
FIG. 10 is a graph similar to FIG. 8 utilizing palladium coated microspheres and an electrolyte containing deuterium within the electrolytic cell of FIG. 2.

The graphic presentation of test results shown in FIGS. 8 to 10 depicts a vertical axis representing the temperature in degrees centigrade (°C.) of the electrolyte, while the horizontal axis to the left represents elapsed time. During these tests, the electrolyte pressure was maintained at atmospheric pressure, or about 14.7 psi.

The test results shown in FIG. 8 depict a baseline run shown at 120 wherein the conductive microspheres are coated with platinum, rather than palladium. The water utilized in the electrolyte is $H_2^1O$. Line 126 represents the ongoing temperature of the electrolyte 59 as it enters into the electrolytic cell 12. Line 128 represents the temperature of the electrolyte 59 as it exits the electrolytic cell 12. At any given point in time, then, $\Delta T$ represents the increase in temperature of the electrolyte 59 as it passes through the electrolysis cell 12.

Table I herebelow represents a tabularization of those test results in FIG. 8. Additionally shown in Table I are the calculations of the power applied across the electrolytic cell in watts (voltage × amps) and a representation of the heat out or derived from the cell, temperature differential × flow rate ($\Delta T \times FR$).

TABLE I

| Pt + $H_2^1O$ @ 14.7 psi (Ref. FIG. 8) | | | | | |
|---|---|---|---|---|---|
| Voltage (V) | Current (Amps) | Flow Rate (ml/min) | $\Delta T$ (°C.) | Heat Out ($\Delta T \times FR$) | Watts In (V × A) |
| 3.7 | 0.05 | 0.34 | 2.5 | 0.8 | 0.19 |
| 4.7 | 0.10 | 0.34 | 10.0 | 3.4 | 0.47 |
| 4.7 | 0.10 | 0.57 | 6.5 | 3.7 | 0.47 |
| 6.2 | 0.20 | 0.57 | 16.5 | 9.4 | 1.24 |
| 7.7 | 0.30 | 0.60 | 33.0 | 18.0 | 2.31 |
| 7.7 | 0.30 | 1.11 | 22.0 | 24.4 | 2.31 |
| 9.0 | 0.40 | 1.08 | 32.0 | 34.6 | 3.60 |
| 9.0 | 0.40 | 1.30 | 24.0 | 31.2 | 3.60 |

In FIG. 9, the graphic test results with respect to the electrolytic cell of FIG. 2 having palladium coated microspheres is shown at 130. Again, the electrolyte inlet temperature is shown at line 132, while the electrolyte outlet temperature is shown at 130. This test was conducted at atmospheric pressure, or 14.7 psi.

The tabularized results of the experimental test shown in FIG. 9 is listed in Table II herebelow. Again, the input variables of voltage, current, and flow rate are shown, the output results of temperature differential (Delta T) and calculated results of wattage in and heat out are also there shown.

TABLE II

Pd + $H_2^1O$ @ 14.7 psi (Ref. FIG. 9)

| Voltage (V) | Current (Amps) | Flow Rate (ml/min) | ΔT (°C.) | Heat Out (ΔT × FR) | Watts In (V × A) |
|---|---|---|---|---|---|
| 4.4 | 0.05 | 0.34 | 4.3 | 1.5 | .22 |
| 4.4 | 0.05 | 0.40 | 3.5 | 1.4 | .22 |
| 5.3 | 0.10 | 0.38 | 8.5 | 3.2 | .53 |
| 6.8 | 0.20 | 0.38 | 21.0 | 8.0 | 1.36 |
| 8.5 | 0.30 | 0.48 | 61.0 | 29.3 | 2.55 |
| 8.5 | 0.30 | 0.62 | 38.5 | 23.4 | 2.55 |
| 9.0 | 0.30 | 1.01 | 30.0 | 30.3 | 2.70 |
| 10.0 | 0.30 | 1.55 | 24.0 | 37.2 | 3.00 |
| 10.0 | 0.35 | 1.06 | 28.0 | 29.7 | 3.50 |
| 10.0 | 0.30 | 1.27 | 34.0 | 43.2 | 3.00 |
| — | 0.70 | 1.44 | 30.0 | 43.2 | |
| 9.0 (est) | 0.31 | 1.50 | 23.0 | 34.5 | 2.80 (est) |
| 9.0 (est) | 0.31 | 1.55 | 24.0 | 37.2 | 2.80 (est) |

Referring to FIG. 10, the electrolytic cell of FIG. 2 was tested utilizing palladium coated microspheres as previously described and operated at atmospherical 14.7 psi. However, in this experiment, the electrolyte included heavy water or deuterium ($H_2^2O$) in solution with lithium sulfate in quantities as above described. The graphic results are generally depicted at 136 and include the electrolyte input temperature at line 138 and the electrolyte output temperature at line 140. Tabularization of these results is shown at Table III set forth herebelow.

TABLE III

Pd + $H_2^2O$ @ 14.7 psi (Ref. FIG. 10)

| Voltage (V) | Current (Amps) | Flow Rate (ml/min) | ΔT (°C.) | Heat Out (ΔT × FR) | Watts In (V × A) |
|---|---|---|---|---|---|
| 4.3 | 0.05 | 0.57 | 3.0 | 1.7 | .22 |
| 5.5 | 0.10 | 0.57 | 8.0 | 4.6 | .55 |
| 7.0 | 0.20 | 0.55 | 22.0 | 12.1 | 1.40 |
| 7.3 | 0.30 | 0.53 | 37.0 | 19.6 | 2.19 |
| 9.3 | 0.37 | 0.51 | 64.0 | 32.6 | 3.44 |
| 9.7 | 0.40 | 0.89 | 37.0 | 32.9 | 3.88 |
| 9.7 | 0.40 | 0.85 | 46.0 | 39.1 | 3.88 |
| 3.5 | 0.05 | 0.40 | 5.5 | 2.2 | 0.18 |
| 7.8 (est) | 0.27 | 1.57 | 66.0 | 103.6 | 2.11 (est) |
| 9.1 (est) | 0.35 | 1.78 | 23.0 | 40.9 | 3.19 (est) |
| 4.5 | 0.05 | 1.78 | 1.5 | 2.7 | 0.23 |
| 8.7 (est) | 0.33 | 1.90 | 22.0 | 41.8 | 2.87 (est) |

Figure 11:
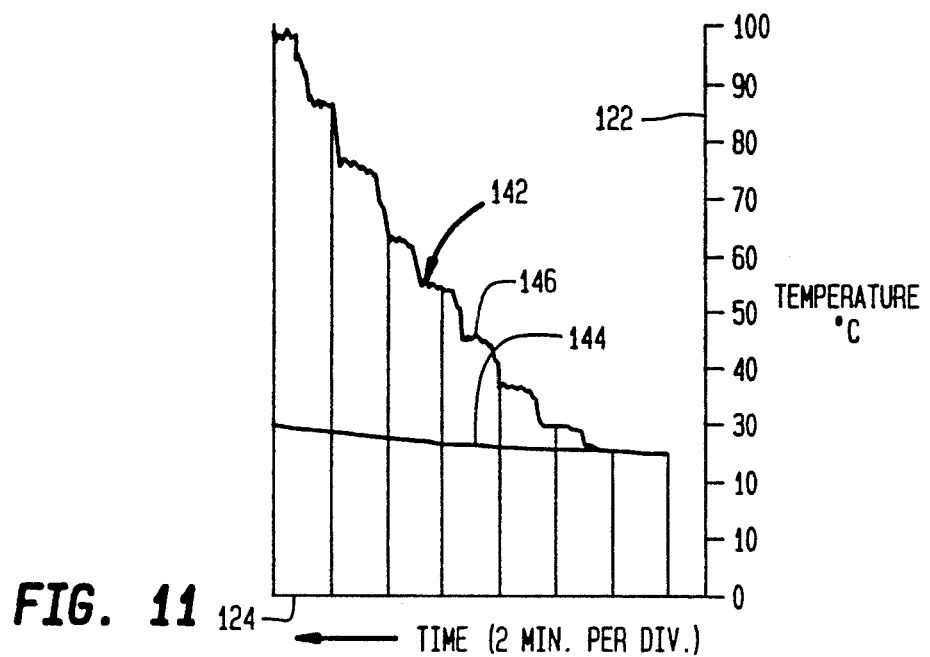
FIG. 11 is a graph representing test results of the system tested in FIG. 9 operating at an elevated pressure.
Figure 12:
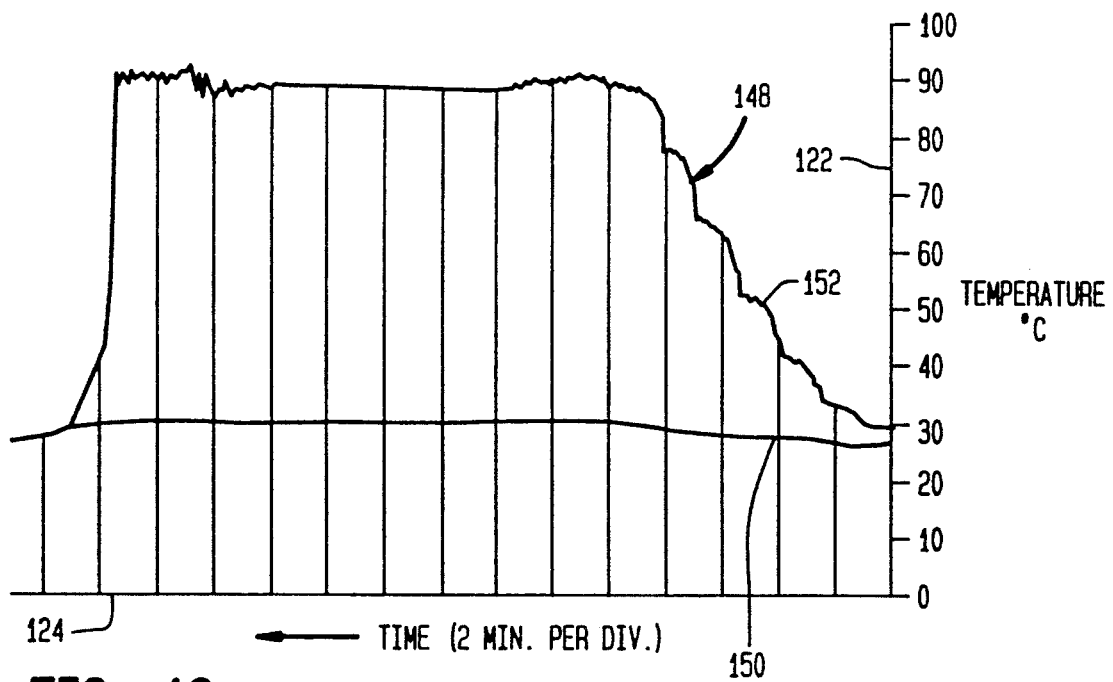
FIG. 12 is a graph representing test results of the system tested in FIG. 10 operating at an elevated pressure.

Referring additionally to FIGS. 11 and 12, the test results wherein the electrolytic cell was operated at an elevated fluid pressure of 180 psi are there shown generally at numerals 142 and 148. In FIG. 11, the electrolytic cell was operated in that test utilizing gold (Au) plated microspheres and an electrolyte utilizing water ($H_2^1O$). The electrolyte inlet temperature is shown at line 144 while the electrolyte outlet temperature is shown at line 146. Table IV set forth herebelow again tabularizes those input/output and computed results as previously described.

TABLE IV

Au + $H_2^1O$ @ 180 psi (Ref. FIG. 11)

| Voltage (V) | Current (Amps) | Flow Rate (ml/min) | ΔT (°C.) | Heat Out (ΔT × FR) | Watts In (V × A) |
|---|---|---|---|---|---|
| 3.5 | 0.05 | .55 | .0 | .0 | 0.02 |
| 3.6 | 0.05 | .55 | .0 | .0 | 0.02 |
| 4.2 | 0.10 | .55 | 2.0 | 1.1 | 0.42 |
| 5.0 | 0.20 | .55 | 4.0 | 2.2 | 1.00 |
| 5.3 | 0.30 | .55 | 11.0 | 6.0 | 1.59 |
| 5.6 | 0.40 | .55 | 20.0 | 11.0 | 2.24 |
| 5.7 | 0.50 | .55 | 29.0 | 15.9 | 2.85 |
| 5.8 | 0.60 | .55 | 36.0 | 19.8 | 3.48 |
| 6.2 | 0.70 | .55 | 48.0 | 26.4 | 4.34 |
| 6.4 | 0.80 | .55 | 58.0 | 31.9 | 5.12 |
| 6.7 | 0.90 | .55 | 69.0 | 37.9 | 6.03 |
| 7.3 | 1.00 | .55 | 77.0 | 42.3 | 7.30 |

In FIG. 12, the electrolytic cell 12 was again operated utilizing palladium coated microspheres 36, rather than gold plated microspheres, in combination with an electrolyte utilizing water ($H_2^1O$) under 180 psi. Line 150 depicts the electrolyte inlet temperature, while line 152 depicts the electrolyte outlet temperature. Table V set forth herebelow sets forth those input, output and calculated test results similar to those previously described.

TABLE V

Pd + $H_2^1O$ @ 180 psi (Ref. FIG. 12)

| Voltage (V) | Current (Amps) | Flow Rate (ml/min) | ΔT (°C.) | Heat Out (ΔT × FR) | Watts In (V × A) |
|---|---|---|---|---|---|
| 3.5 | 0.05 | .57 | 3.0 | 1.7 | 0.18 |
| 4.5 | 0.10 | .59 | 3.0 | 1.8 | 0.45 |
| 5.4 | 0.20 | .59 | 7.0 | 4.1 | 1.08 |
| 6.0 | 0.30 | .57 | 15.0 | 8.5 | 1.80 |
| 6.6 | 0.46 | .59 | 25.0 | 14.7 | 3.04 |
| 7.2 | 0.50 | .59 | 38.0 | 22.4 | 3.60 |
| 7.4 | 0.60 | .59 | 50.0 | 29.5 | 4.44 |
| 6.5 | 0.60 | .59 | 60.0 | 35.4 | 3.90 |
| 6.6 | 0.60 | .59 | 59.0 | 34.8 | 3.96 |
| 6.6 | 0.60 | .59 | 62.0 | 36.6 | 3.96 |

RERUNS

To evaluate the repeatability of the above results, two additional tests were rerun and are tabularized herebelow in Tables VI and VII.

TABLE VI

Pd + $H_2^1O$ @ 180 psi

| Voltage (V) | Current (Amps) | Flow Rate (ml/min) | ΔT (°C.) | Heat Out (ΔT × FR) | Watts In (V × A) |
|---|---|---|---|---|---|
| 3.7 | 0.05 | .56 | 3.0 | 1.68 | .18 |
| 4.8 | 0.10 | .56 | 5.7 | 3.19 | .48 |
| 5.6 | 0.20 | .56 | 15.5 | 8.68 | 1.12 |
| 6.2 | 0.30 | .56 | 26.0 | 14.56 | 1.86 |
| 6.5 | 0.40 | .56 | 35.0 | 19.60 | 2.60 |
| 6.8 | 0.50 | .58 | 48.0 | 27.84 | 3.40 |
| 7.3 | 0.60 | .58 | 63.0 | 36.54 | 4.38 |
| 7.5 | 0.60 | 1.10 | 44.0 | 48.40 | 4.50 |

TABLE VII

Pd + $H_2^2O$ @ 180 psi

| Voltage (V) | Current (Amps) | Flow Rate (ml/min) | ΔT (°C.) | Heat Out (ΔT × FR) | Watts In (V × A) |
|---|---|---|---|---|---|
| 3.7 | 0.05 | .58 | 3.0 | 1.74 | .18 |
| 5.0 | 0.10 | .58 | 6.0 | 3.44 | .50 |
| 6.2 | 0.20 | .58 | 15.0 | 8.70 | 1.24 |
| 6.6 | 0.30 | .58 | 25.0 | 14.50 | 1.98 |
| 7.2 | 0.40 | .58 | 38.0 | 22.04 | 2.88 |
| 7.7 | 0.50 | .58 | 54.0 | 31.32 | 3.85 |

TABLE VII-continued

| Pd + $H_2{}^2O$ @ 180 psi | | | | | |
|---|---|---|---|---|---|
| Voltage (V) | Current (Amps) | Flow Rate (ml/min) | ΔT (°C.) | Heat Out (ΔT × FR) | Watts In (V × A) |
| 7.3 | 0.50 | .58 | 53.0 | 30.74 | 3.65 |

In Table VI, the electrolytic cell utilizing palladium coated microspheres in an electrolyte of water ($H_2{}^1O$) operating at an elevated fluid pressure of 180 psi was rerun. The same electrolytic cell was again rerun utilizing the same palladium coated microspheres with an electrolyte having heavy water or deuterium ($H_2{}^2O$) operated at 180 psi.

ANALYSIS

Figure 13:
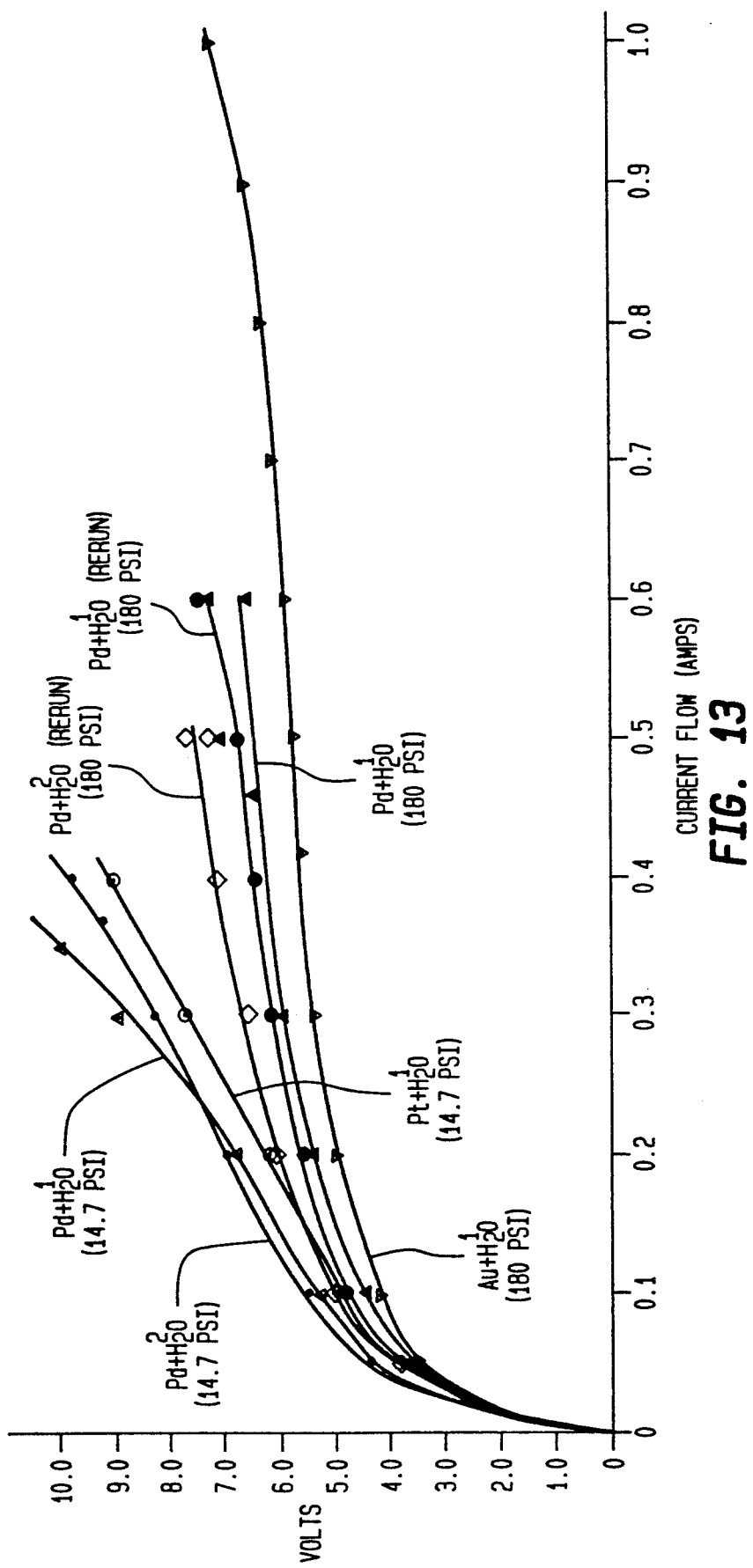
FIG. 13 is a graphic summary of test results operating the electrolytic cell shown in FIG. 2 showing voltage across the conductive grids within the electrolytic cell vs. current flow through the cell for various embodiments of microspheres, electrolytes and internal operating pressures.
Figure 14:
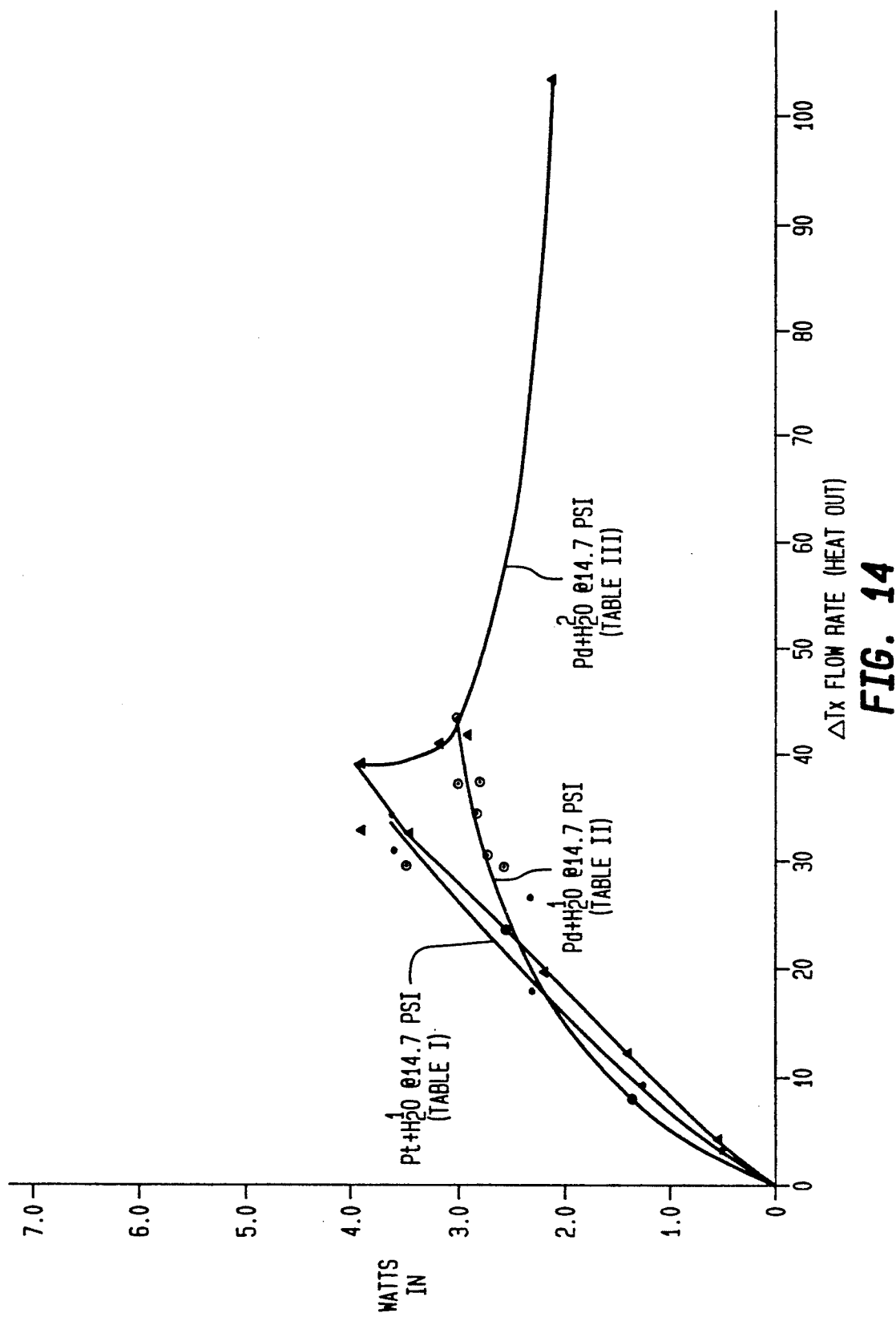
FIG. 14 is a graphic representation of test results using two forms of coated microspheres and three forms of water at atmospheric pressure showing power input vs. heat output from the electrolytic cell.
Figure 15:
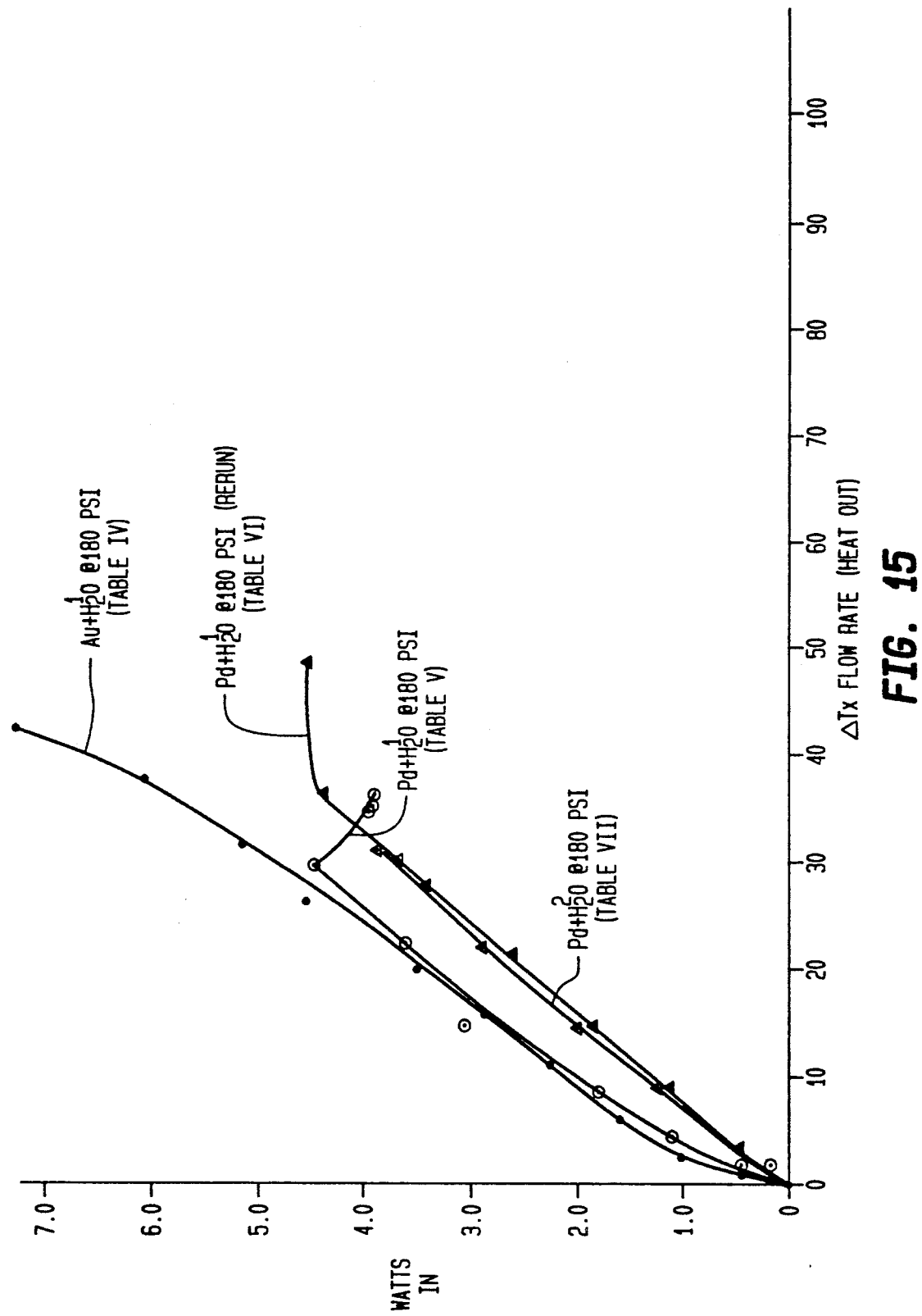
FIG. 15 is a graphic representation of test results using two forms of coated microspheres and three forms of water at 180 psi internal operating pressure showing power input vs. heat output from the electrolytic cell.

Referring now to FIGS. 13, 14 and 15, analytical curves of the above reported experiments and tables are graphically displayed. FIG. 13 may be viewed as a calibration curve between voltage applied across the electrolytic cell in the vertical scale plotted against current flow in amps on the horizontal scale. All of the test results of Tables I to VII for these variables are there shown.

In the graph shown in FIGS. 14 and 15, the vertical scale is in wattage input into the electrolytic cell, while the horizontal scale is in heat output as calculated by the product of temperature differential (ΔT) and flow rate (ml/min). FIG. 14 is a summary of the tabular results of Tables I, II and III wherein the electrolytic cell is operated at atmospheric pressure or about 14.7 psi. FIG. 15 summarizes the results of Tables IV, V, VI and VII wherein the electrolytic cell was operated at an elevated pressure of 180 psi.

OBSERVATIONS

In FIG. 13, it is observed that the relationship between input voltage and current flow varies between the particular electrolytic cells in a predictable manner. Note the grouping of the curves wherein the electrolytic cell was operated at atmospheric versus elevated operating pressures.

In Tables II and III, a few of the voltage input entries were not taken during testing and have been estimated. These voltage estimates were derived from the appropriate curve of FIG. 13 wherein the current flow was known from the experimental results. The corresponding wattage input was also noted as being estimated.

In FIGS. 14 and 15, the curves with respect to Tables I and IV a plating for the microspheres was chosen (platinum and gold), which is not of the "metallic hydride" group previously discussed. These curves do not appear to show any unusual discontinuity with respect to heat output vs. wattage input. However, the curves depicting the results in Tables II, III, V and VI wherein palladium coated microspheres were utilized, a prominent discontinuity with respect to heat output vs. wattage input is present, indicating an unexpected increase in that heat output. The curve depicting Table VII, however, did not depict such a discontinuity apparently because the wattage input was not raised sufficiently to achieve that level of input required to trigger the discontinuity.

Metal coated beads prepared as described in FIGS. 5 to 7 functioned in a test program as hereinabove described for twenty-one (21) days in an electrolyte previously described at a current rate of 0.2 amps per centimeter squared without any of the conductive microspheres becoming unglued or dislodged from the metal plate 102.

CELL RESISTANCE

In preparing the electrolytic cells for testing, the cell resistance utilizing a Whetstone Bridge was utilized prior to the introduction of the electrolyte into the electrolytic cell. This cell resistance, when dry, should be infinitely high. Otherwise, a short between the anode screen and the cathode beads exists and the unit would have to be repacked.

Prior to testing, with electrolyte present, the cell resistance was set at 16 ohms by appropriate compression of the end members.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A method of electrolysis and heating a water solution containing a conductive salt forming a liquid electrolyte comprising the steps of:
   A. circulating said electrolyte through an electrolytic cell; said electrolytic cell including:
      a non-conductive housing and an inlet and an outlet;
      a first conductive foraminous grid positioned within said housing adjacent to said inlet;
      a second conductive foraminous grid positioned within said housing spaced from said first conductive grid and adjacent to said outlet;
      a plurality of conductive microspheres each having a conductive metallic surface which is readily combinable with hydrogen or an isotope of hydrogen to form a metallic hydride, said plurality of microspheres in electrical communication with said first conductive grid and electrically isolated from said second grid;
   B. passing said electrical current between said first and second grids when said electrolyte is circulating within said electrolytic cell.
   C. removing heat from said electrolyte after said electrolyte exits said electrolytic cell through said outlet.

2. A method as set forth in claim 1, wherein:
   said conductive salt is capable of forming a hydride and is chosen from a group containing lithium, boron, aluminum, gallium and thallium.

3. A method as set forth in claim 2, wherein:
   said conductive salt is lithium sulphate.

4. A method as set forth in claim 1, wherein said electrolytic cell further comprises:
   a plurality of non-conductive microspheres each positioned within said housing adjacent said second grid;
   a foraminous non-conductive mesh positioned within said housing between said conductive and said non-conductive microspheres to prevent said conductive microspheres from contacting said second grid.

5. A method as set forth in claim 1, wherein said electrolytic cell further comprises:

a foraminous non-conductive mesh positioned within said housing adjacent to and spaced from said second grid;

said electrolytic cell being in an upright position whereby said conductive microspheres are loosely packed within said electrolytic cell and fall by gravity atop said first grid when said pumping means is stopped;

said conductive microspheres being elevated above said first grid by said electrolyte flowing upwardly through said housing at a preselected flow rate, said non-conductive mesh preventing said conductive microspheres from contacting said second grid.

6. A method as set forth in claim 1, wherein said electrolytic cell further comprises:

a conductive plate positioned within said housing defining said first grid;

said conductive microspheres adhered against and in electrical communication with said conductive plate;

a non-conductive spacer connected along two opposing edges of said conductive plate;

a plurality of conductive wire bands each connected around said spacers and defining said second grid, said wire bands in electrical isolation from said conductive microspheres and said conductive plate;

said electrolyte in fluid communication between said conductive microspheres and said conductive bands.

7. A method as set forth in claim 1, further comprising:

temperature monitoring means for measuring an inlet and an outlet temperature of said electrolyte.

8. A method as set forth in claim 1, wherein:

each said conductive microsphere is sized in the range of about 1 mm or less in diameter.

9. A method as set forth in claim 1, further comprising: means for pressurization of said electrolyte within said housing.

10. A method as set forth in claim 1, wherein:

said electric power source is direct current and said first grid is a cathode (−) and said second grid is an anode (+).

11. a method as set forth in claim 1, wherein:

said water is a heavy water.

12. A method as set forth in claim 11, wherein:

said heavy water is deuterium.

13. A method as set forth in claim 1, wherein:

said metallic surface is taken from the group consisting of:

lanthanum, praseodymium, cerium, titanium, zirconium, vanadium, tantalum, uranium, hafnium, and thorium.

14. A method as set forth in claim 1, wherein:

said metallic surface is palladium.

15. A method as set forth in claim 14, further comprising:

means for compressing said conductive microspheres together to increase surface contact pressure therebetween.

* * * * *